No. 862,494. PATENTED AUG. 6, 1907.
L. H. MARTELL.
PACKING.
APPLICATION FILED AUG. 20, 1906.

3 SHEETS—SHEET 1.

WITNESSES:
J. Herbert Bradley.
William H. Wilson.

INVENTOR
Louis H. Martell,
by Christy & Christy, Atty's

No. 862,494. PATENTED AUG. 6, 1907.
L. H. MARTELL.
PACKING.
APPLICATION FILED AUG. 20, 1906.

3 SHEETS—SHEET 2.

WITNESSES: INVENTOR

No. 862,494. PATENTED AUG. 6, 1907.
L. H. MARTELL.
PACKING.
APPLICATION FILED AUG. 20, 1906.

3 SHEETS—SHEET 3.

WITNESSES:
J. Herbert Bradley.
William H. Wilson

INVENTOR
Louis H. Martell,
by Christy & Christy, Atty's

UNITED STATES PATENT OFFICE.

LOUIS H. MARTELL, OF ELLWOOD CITY, PENNSYLVANIA.

PACKING.

No. 862,494.  Specification of Letters Patent.  Patented Aug. 6, 1907.

Application filed August 20, 1906. Serial No. 331,350.

*To all whom it may concern:*

Be it known that I, LOUIS H. MARTELL, residing at Ellwood City, in the county of Lawrence and State of Pennsylvania, a citizen of the United States, have invented or discovered certain new and useful Improvements in Packing, of which improvements the following is a specification.

The invention described herein relates to certain improvements in packing, whereby tight joints can be formed simultaneously against opposing surfaces of two mechanical parts or elements, one surrounding the other, and one movable relative to the other, a piston in its cylinder or a piston rod through its stuffing box.

The invention is hereinafter more fully described and claimed.

Figure 1:
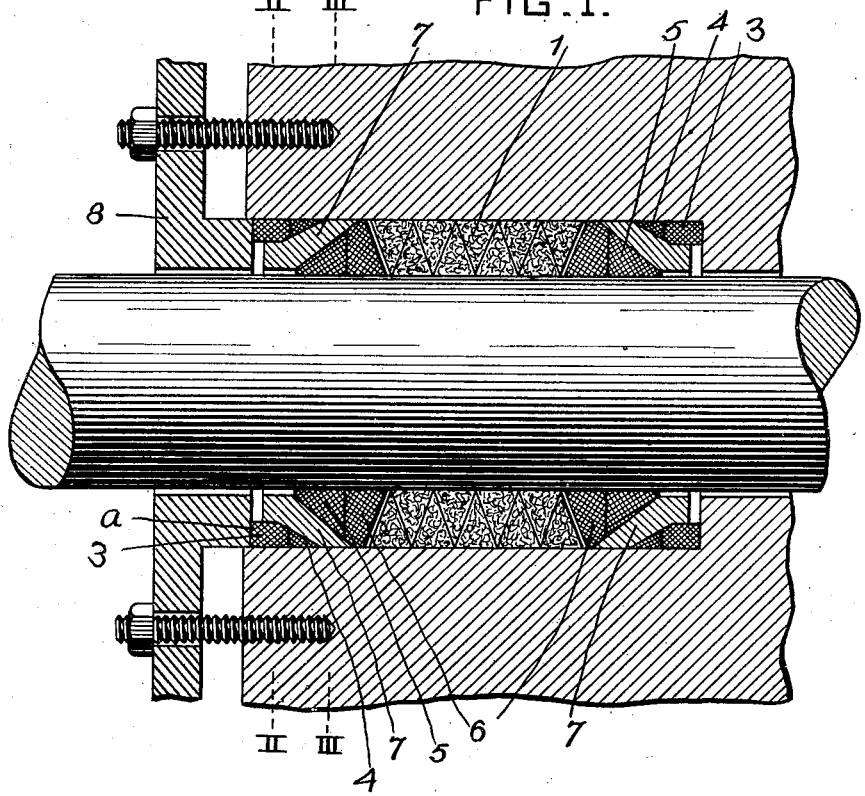
Figure 2:
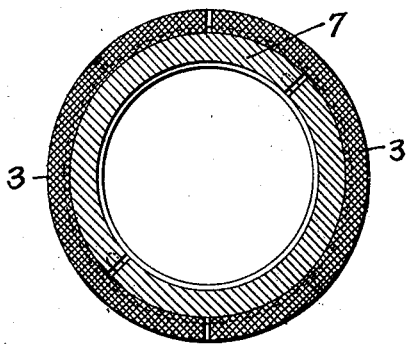
Figure 3:
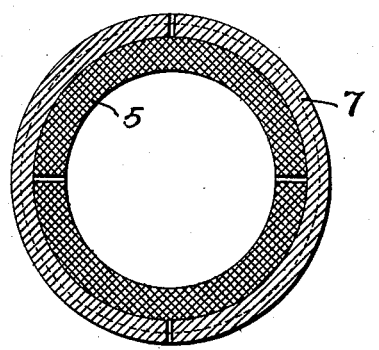
Figure 4:
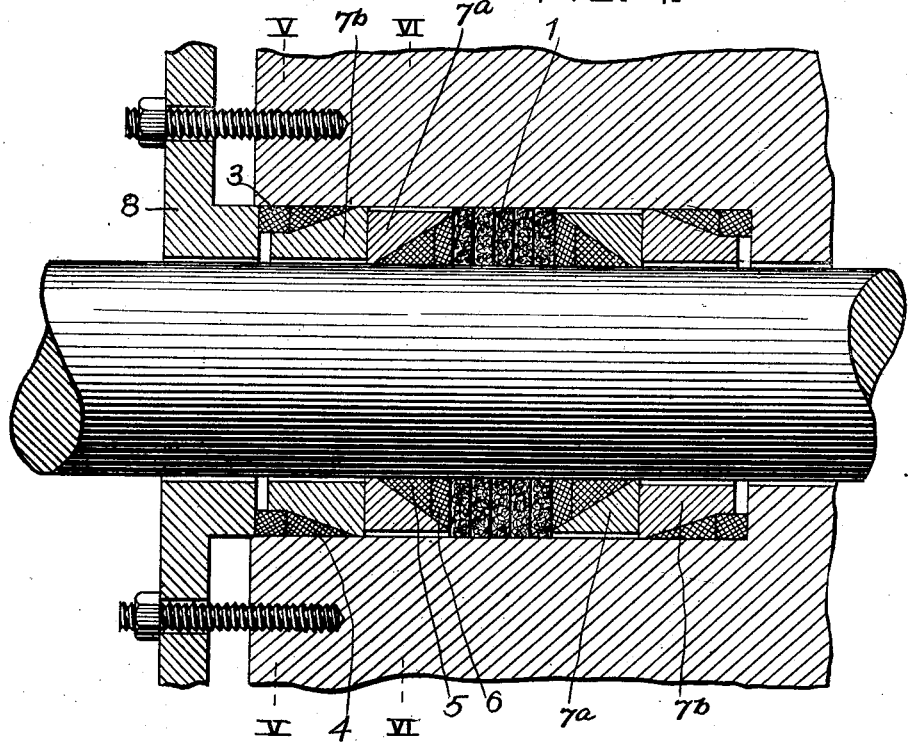
Figure 5:
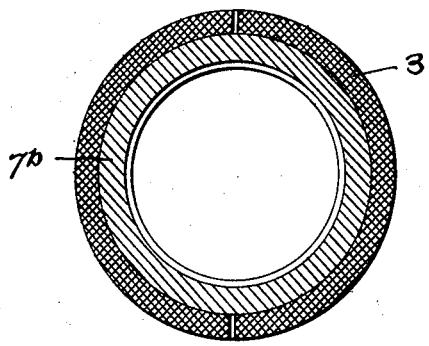
Figure 6:
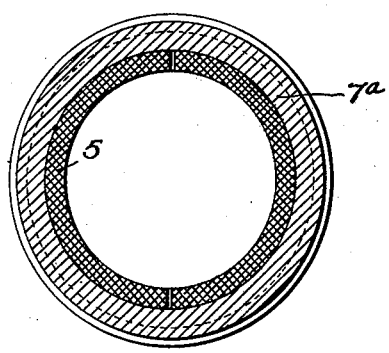
Figure 7:
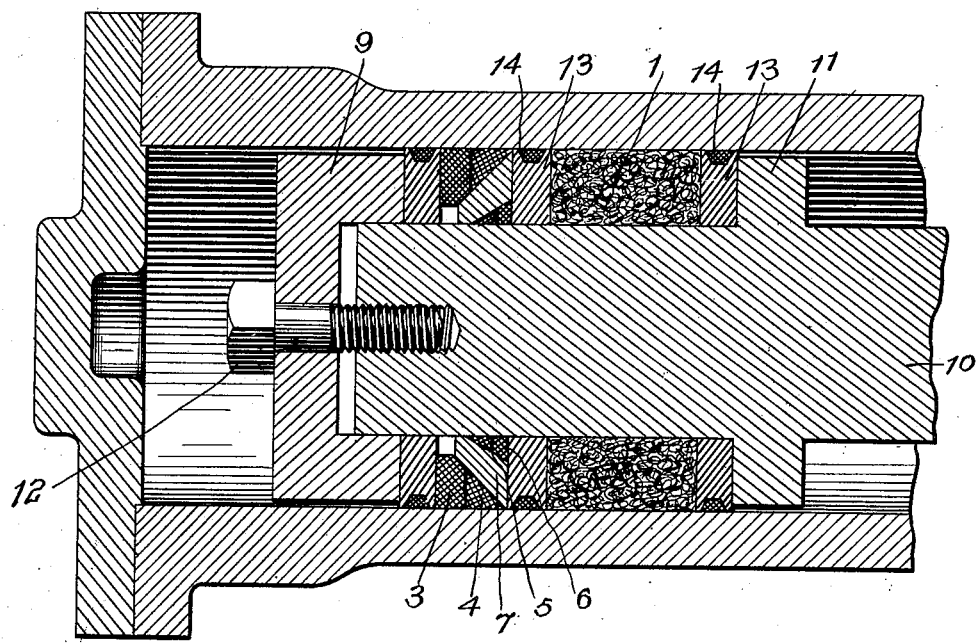
Figure 8:
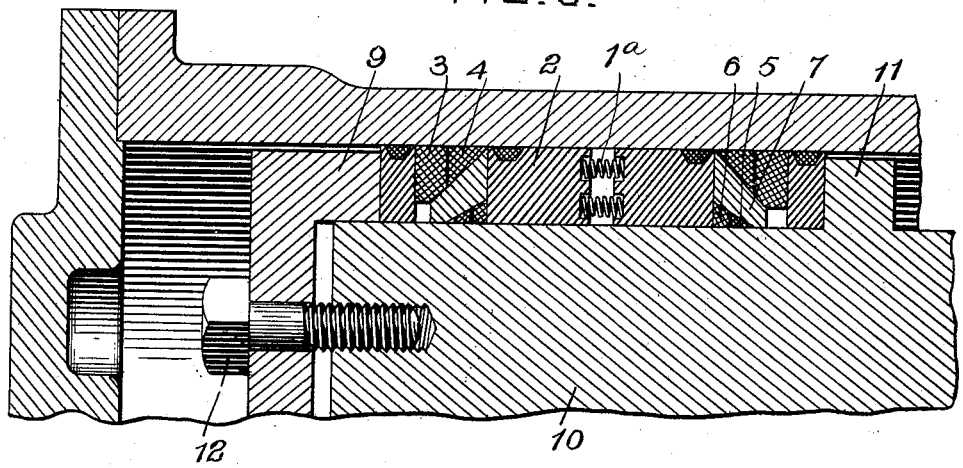

In the accompanying drawings forming a part of this specification, Figure 1 is a sectional elevation showing my improved packing applied to a piston rod, Figs. 2 and 3 are sectional views on planes indicated by the lines II—II and III—III Fig. 1; Fig. 4 is a view similar to Fig. 1 illustrating another form of my invention; Figs. 5 and 6 are transverse sections on planes indicated by lines V—V and VI—VI Fig. 4. Fig. 7 is a sectional view showing my improvement applied to a piston, and Fig. 8 is a view similar to Fig. 7 illustrating a modified structure.

In the practice of my invention I preferably employ in connection with my improved packing a resilient bearing or cushion which may be formed of a fibrous packing material as shown in Figs. 1 and 7. Or such bearing or cushion may be formed by a spring $1^a$ preferably arranged between rings 2 surrounding the piston or rod, as shown in Fig. 8. As shown in Figs. 1, 7 and 8 my improved packing may be applied at one, two or more places around the rod or piston.

The improved packing consists of two annular portions, each portion preferably being divided longitudinally. These longitudinal sections or rings, 3, 4, and 5, 6, are formed of some soft or yielding metal as lead, and are split or formed of two or more transverse sections, as shown in Figs. 2, 3, 5 and 6, so that they can be readily expanded and contracted as hereinafter described. These rings are so arranged that a solid portion of one will cover the space or spaces between adjacent ends of the other. The rings 3 and 4, which are designed to bear against the wall of the surrounding element as the stuffing box or cylinder, have their outer faces straight, while the inner face of the ring 4 and a portion at least of the inner face of the ring 3 is beveled or inclined, so that said rings can be caused to expand against the wall of the stuffing box or cylinder by the wedge ring 7, which has its outer face inclined to form an acute angle with the piston rod. The ring 3 is made of such a length that its upper end will extend beyond the end of the ring 7, and bear against an annular adjustable element as the gland 8 or the shoulder 9 on the piston 10. Where two sets of packing are employed the ring 3 of the second set will bear against the inner end of the stuffing box or a second ring or shoulder 11 on the piston. In the construction shown in Figs. 7 and 8, the shoulder 9 is formed by a cap fitting over the end of the piston and adapted to be shifted by the bolt 12. The inner faces of the rings 5 and 6 which are designed to bear against and form a tight joint with the rod or piston are made parallel therewith while their outer faces and the inner face of the wedge ring are inclined to form an acute angle with the side of the stuffing box. The rings 5 and 6 are yieldingly held as against movement along the stuffing box or piston by the resilient cushion 1, and if pressure be applied to the ring 3 by adjusting the gland 8 or shoulder 9, it and the ring 4 will be caused to move outwardly or expand against the wall of the surrounding part or element by the inclined outer face of the wedge ring. The pressure applied to the rings 3 and 4 will tend to cause the wedge-ring to move along the rod or piston and thereby apply a contractile force to the rings 5 and 6 forcing them in against the piston or rod. Thus by pressure applied to the ring 3 tight joints are formed around the piston or rod and against the surrounding part or element.

While the ring 3 may be made triangular the portion $a$ projecting beyond the wedge ring would be liable to be bent over when pressure was applied and hence it is preferred to make the end portions of its outer face and the outer face of the wedge ring straight and parallel with the piston or rod. While not necessary it is preferred to make the rings 3 and 4 of softer metal than the rings 5 and 6, as the former are not subjected to wear. The wedge ring is made of harder metal than the rings 3 and 4, 5 and 6, preferably of cast iron, and may be solid, but is preferably made in two or more sections held in alinement with each other by dowel-pins.

As shown, two or more sets of my improved packing may be arranged around the inclosed part or element, the position of the parts of one set of packing being the reverse of that of the parts of the other set, so that pressure is applied to the rings 5 and 6 through cushion 1, while the ring 3 bears against the inner end of the stuffing box or the shoulder or ring 12.

In Fig. 4 is shown a form of my invention adapted for use in connection with pistons or rods having a lateral play or vibration. As shown the wedge ring is made of two longitudinal parts or sections, $7^a$ and $7^b$. The part $7^a$ has an internal diameter at the end of its inclined face equal or nearly equal to the diameter of the rod, while the external diameter of the part $7^a$ is less than the internal diameter of the surrounding part or element. The external diameter of the part $7^b$ at the end of its inclined face is such that this part will not have any lateral movement in the surrounding part or element while its internal diameter is greater than the diameter of the piston or rod, so that the piston or rod can move laterally therein. In case of vibration of the rod the rings 3 and 4 and the part 7ᵃ will move laterally with the rod or piston which will move laterally within the part 7ᵇ of the wedge ring. Hence there will not be any unequal wear nor will the efficiency of the seals formed by the rings 3, 4 and 5, 6, be affected.

In Fig. 7 I have shown my improved packing applied to pistons, in which case it is preferred to arrange the packing between bearing rings 13, preferably provided in their outer faces with soft metal wearing portions 14. As shown in Fig. 8 the resilient cushion or bearing for the packing may be formed by two annular blocks or rings 2 yieldingly held apart by springs.

It is characteristic of my invention that the rings 3 and 4, 5 and 6, are held against the walls of the two parts or elements with a pressure proportional to the yielding resistance presented by the cushion or bearing 1.

I claim herein as my invention:

1. A packing for pistons, piston rods, etc. having in combination two radially yielding metal annuli and an annular wedge arranged between the annuli and adapted to cause one annulus to expand and the other to contract by the inward movement of one of the annuli.

2. A packing for pistons, piston rods, etc., having in combination two radially yielding metal annuli having their adjacent faces inclined and an annular wedge having inclined faces arranged between the annuli, and adapted to cause one annulus to expand and the other to contract by the inward movement of one of the annuli.

3. A packing for pistons, piston rods, etc., having in combination two radially yielding metal annuli having their adjacent faces inclined and a transversely divided annular wedge arranged between the annuli, and adapted to cause one annulus to expand and the other to contract by the inward movement of one of the annuli, one of the sections having a diameter greater than the diameter of the other section.

4. A packing for pistons, piston rods, etc., having in combination two radially yielding metal annuli, an annular wedge arranged between the annuli and adapted on the shifting of the annuli to cause opposite movements of the annuli and a resilient support or cushion for one of the annuli.

5. In a packing for pistons, piston rods, etc., two packing elements each consisting of two radially yielding metal annuli and an annular wedge arranged between the annuli in combination with a resilient cushion interposed between the two packing elements.

6. A packing for piston rods having in combination two pairs of metal rings having their adjacent faces inclined and the opposite faces parallel or substantially parallel with the axes of the rings and an annular wedge having inclined faces extending inside of one pair of rings and outside of the other pair.

In testimony whereof, I have hereunto set my hand.

LOUIS H. MARTELL.

Witnesses:
J. C. McCORMICK, Jr.,
CHARLES BARNETT.